INVENTOR.
Howard W. Hunt
BY Allen & Allen
ATTORNEYS

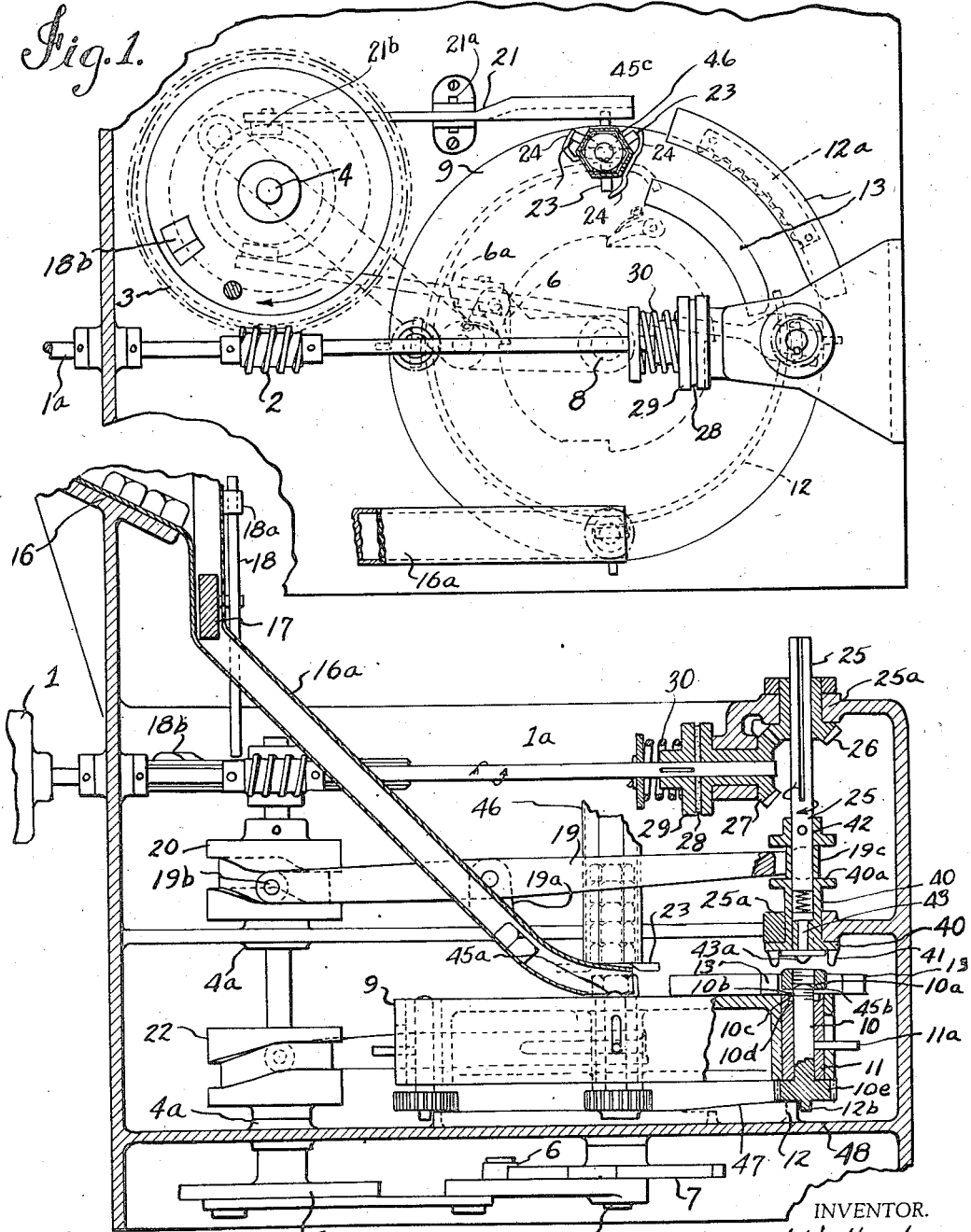

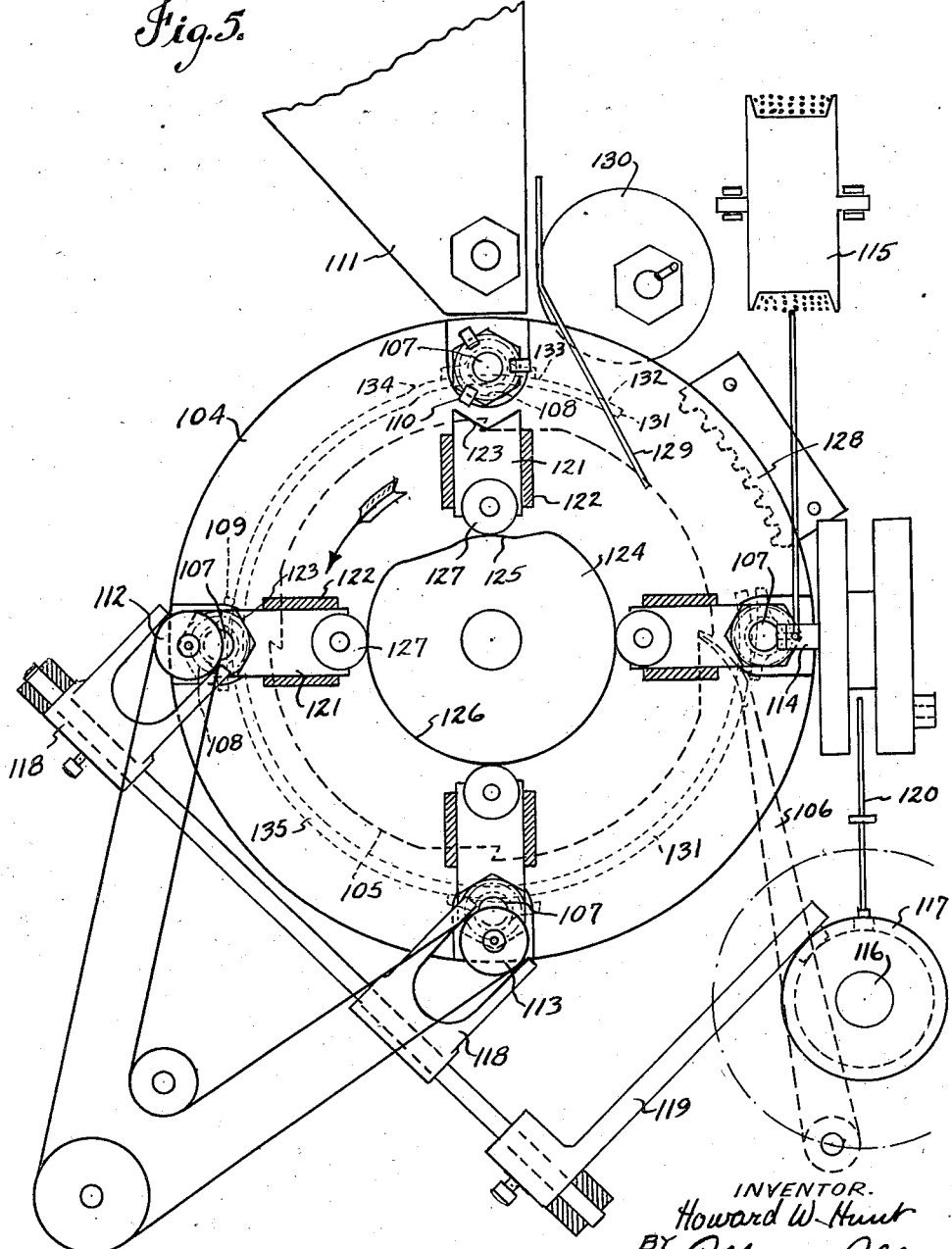

Patented Apr. 28, 1936

2,038,933

UNITED STATES PATENT OFFICE 2,038,933

DEVICE FOR LOCATING NUTS WITH RE-
SPECT TO THE STARTING POINT OF
THEIR THREADS

Howard W. Hunt, Norwood, Ohio

Application November 4, 1932, Serial No. 641,242

21 Claims. (Cl. 10—72)

The problem to which my invention is addressed is that of providing mechanical and automatic or semi-automatic means for stacking nuts in a predetermined relationship, having to do with the starting points of the threads of said nuts. My invention will be of utility in connection with processes or devices for the after treatment of threaded nuts where the location of the threads is important. More particularly my invention has been designed for use in connection with processes and machines for making lock nuts where a locking member is attached to a nut and is intended to engage the threads of a bolt, shaft or stud upon which said nut is to be turned. In one such device there is attached to the under side of a nut a small pointed arm so disposed as to engage the threads of the bolt and to turn in such a way as to bite into these threads upon reverse rotation of the nut to prevent the loosening thereof. It will be clear that the pointed end of this arm must engage the threads of the bolt in a certain relationship. Preferably the pointed end will engage in the valley of the thread rather than the crest. It will also be obvious that this relationship may be attained if the arm is attached to the nut at a predetermined point with respect to the starting point of the thread of said nut, but that the relationship will not be attained if the arm is attached haphazardly to the nut without regard for the starting point of the thread. It is possible by inspection to arrange nuts in a predetermined relationship according to the starting points of their threads; but this is tedious, slow and uneconomical. The primary object of my invention is to provide a device and process which will accomplish this arrangement expeditiously and automatically or semi-automatically, whereby hand work is eliminated as well as the chances of error.

These and other objects of my invention which will be set forth hereinafter or will be apparent to one skilled in the art upon reading these specifications, I accomplish by that certain construction and arrangement of parts, and in that process of which I shall now describe an exemplary embodiment, reference being had to the accompanying drawings, wherein—

Figure 1 is a plan view of one form of my machine, in which the frame parts have been eliminated for the sake of clearness.

Figure 2 is an elevation, partly in section, of the same machine, showing portions of the frame members.

Figure 5 is an elevation, with parts in section, of a modification of the multiple spindle machine of Figures 1 and 2, in providing a different device to hold the nuts, and showing means for operation on the nuts.

Briefly in the practice of my invention, the nuts are fed automatically or by hand to the machine or to a suitable hopper on the machine. In the machine they are fed seriatim to a point at which they are to be located. The location is accomplished by producing a relative rotation between the individual nut and a threaded stud or the like having a locating shoulder. The thread on this stud is, of course, fixed, and therefore bears a given relationship to the rotative position of this stud. Thus, when the thread on the stud engages fully in the thread on the nut, and the stud is turned to a predetermined position, the nut may thereby be located with respect to an external engaging means, such as a guide or the like. When this location has been accomplished the nut and the threaded stud are disengaged by a relative rotation of one to the other.

It will be understood that nuts so located may be maintained in located position by means engaging the flat sides of the nuts, whether the nuts be held stationary thereby or moved through space.

In the practice of my invention, after the nuts have been located they are moved by means which maintain their relative location to a stacking point where they are stacked or otherwise assembled in position to receive the after treatments to which they are to be subjected, or made into a convenient assemblage which may be transferred to a position to receive the after treatments without loss of the located relationship aforesaid.

Figure 4:
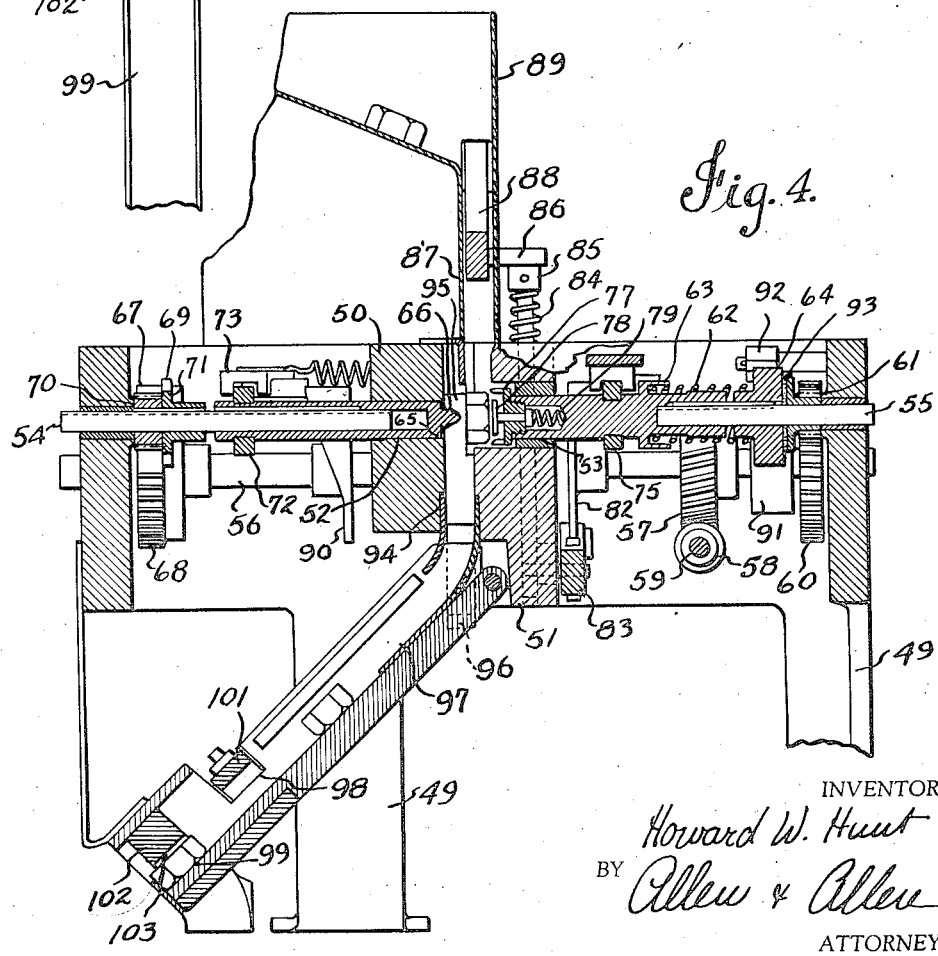
Figure 4 is a vertical longitudinal section on line 4—4 of Figure 3.

With this general explanation, the general features of my mechanism will be clear, and I will proceed to a specific description of two exemplary embodiments of my device, the first illustrated in Figures 1 and 2, and called by me a "multiple spindle machine", and the second illustrated in Figures 4 and 5, and called by me a "single spindle machine", it being understood that additional modifications may be made in my device without departing from the spirit thereof.

In Figures 1 and 2, a source of power, such as an electric motor 1, drives a shaft 1a from which power is taken off at two points, one of these points being that of the engagement of a worm 2 with a gear wheel 3 mounted upon a vertical shaft 4. This shaft may be provided with two or more bearings in the frame of the device, such as the ball bearings 4a.

The shaft 1a also has power taken from it by means of meshing bevel gears 26 and 27. The gear 26 is the driven gear and is fastened upon a vertical shaft 25 journaled in the frame as in ball bearings 25a. The shaft 25 carries means, in this embodiment of my invention, for turning the nuts with respect to the threaded stud hereinabove referred to, which threaded stud, when such operation is being carried on, will be held in fixed relationship so that when the nut has been screwed thereon tightly it will be definitely located with respect to certain guiding members. Since the nuts enter my machine in a haphazard relationship, it will be clear that some of the nuts will have to be turned further than others in screwing them upon a threaded stud, for which reason it is necessary to provide means for a slippage in the driving mechanism. This I provide for by mounting the bevel gear 27 rotatively upon the shaft 1a and causing it to be driven by a clutch member 29 slidably but non-rotatively mounted upon the shaft 1a and held by a spring 30 against the gear 27 with the interposition of a friction pad 28 or the like. It will be obvious that the gear 27 will be driven with the shaft 1a unless and until a resistance applied against the driving force shall equal or exceed the frictional and driving engagement of members 27 and 29 through the friction means 28.

In the machine of Figures 1 and 2, I provide a table 9 rotatably mounted by means of a vertical shaft 8 which may be held by a bearing 8a in the frame, or otherwise as desired. The shaft 8 bears at its lower end a ratchet wheel 7 which is engaged by a pawl 6 pivoted to a wheel 5 on the end of the vertical shaft 4. The pawl 6 may be controlled by a spring 6a, and the purpose of the arrangement described is to provide for a step by step rotation of the table 9 in accordance with rotations of the shaft 4. In the particular embodiment shown, the table bears four of the spindles hereinafter to be described, and consequently the movement desired is a quarter turn of the table for each operation. With more or less spindles other movements may be desired, as will be obvious; and instead of the wheel 5, I may employ a pitman or the like, or I may substitute a Geneva movement or other means for changing a continuous rotary to an interrupted rotary motion, for the relatively simple pawl arrangement which I have shown.

The apparatus of Figures 1 and 2 is a four-stage apparatus in which the table 9 is designed to bear four spindles 10, one of which is completely illustrated. The spindle 10 is the threaded stud referred to in the general statement above, and is journaled in a bushing 11 mounted on the table 9. This bushing has a projection 11a extending through the side of the table and adapted to be engaged by an external agency for a purpose hereinafter to be described.

The shaft 4 also bears a pair of cams 20 and 22, the first of which controls the feeding of the nuts to the machine and the engagement of the nuts by a chuck, as will be described. The second controls the stacking of the nuts.

An exemplary chucking device is shown in Figure 2 having a body 40 having portions 41 for non-rotative engagement with the top edges of the nuts. The body 40 is grooved as at 40a for rotative engagement with a raising and lowering member. The body 40 is also bored as at 42 for the reception of the shaft 25 which is at least non-rotatably but may be slidably mounted therein. The body 40 is also hollowed out as shown, and contains a plunger 43 controlled by a spring 44, the purpose of the plunger being to push the nut 45 out of engagement with the jaws 41. For the purpose of locating the nut somewhat more positively, the plunger 43 may have a conical center-finding boss 43a thereon adapted to fit within the threaded hole in the nut. The spindle or threaded stud is shown in Figure 2 at 10, having a center-finding boss 10a thereon, bearing a thread 10b for engagement in the threads of the nut. The bushing 11 forms shoulder 10c to locate the nut with respect to the beginning portion of the thread 10b. It may also have a clearance groove 10d, to take care of possible burrs on the nuts. I have shown in Fig. 1 at 13 a pair of side guide members, the function and construction of which will hereinafter be described.

An arm 19 (Fig. 2) is pivoted on a member 19a on the frame, and at one end carries a stud 19b engaging in the slot of cam 20. At the other end it bears an enlargement 19c engaging in the groove 40a of the chuck member 40. Through the action of the cam 20 the outer end of the arm 19 is raised or lowered, causing the chuck 40 to move up and down. As shown, the shaft 25 is slidably but non-rotatably mounted with respect to the gear 26 and fixedly mounted with respect to the chuck 40.

The nuts 45 may be placed by hand or otherwise in haphazard relationship into a slide 16. A trigger 17, actuated by an arm 18 pivoted at 18a, controls the release of the nuts from the slide 16. The arm 18 is connected with the trigger 17 at one end, and at the other is engaged by the cam 18b (see Fig. 1). Through the action of the trigger, the nuts are admitted seriatim to a slide 16a of curved form which, in the embodiment shown, guides the nuts and carries them down to a position to be engaged by the table 9. A nut in such position of engagement is shown at 45a, and the table 9 has a recess 9a to keep the nut from sliding with respect to the table. When so positioned the nut will lie directly above one of the spindles 10 in a position which may be clearly understood by reference to numeral 45a in Fig. 1. The continued rotation of shaft 4 causes the table to move in a counter-clockwise direction a quarter turn, so that the nut is carried to a position indicated by the numeral 45b in Figure 1. The continued rotation of shaft 4 next causes a further movement of the arm 19 to bring the chuck member 40 into engagement with the nut. The stud or spindle 10 is held in fixed position at this point by the engagement of a flat part 12b at its lower end with a segmental track 12 on the frame. The chuck is driven by the shaft 25, as aforesaid, and this chuck engages the nut so as to turn it down upon the thread of the stud 10 as far as it will go. At this point the clutch comprising members 27, 28, and 29 will slip. Spring-pressed jaws 13 of segmental form are located one on either side of the nut 45b. These jaws are pivoted as at 13a and controlled by a spring 14. The continued rotation of the shaft 4 is next effective through the operation of cam 20 to raise the arm 19, thereby disengaging the clutch 40 from the nut 45b which is now located with respect to the jaws or guides 13 and held thereby against rotation. A further rotation of the shaft 4, through the action of the pawl 6, rotates the table 9 another quarter turn. During this rotation the stud 10 is rotated in a direction opposite to the rotation of shaft 25 through the interengagement of gear 10e and the rack or internal segment member 12a, which operation unscrews the stud 10 from the nut 45b, the nut being held against rotation by the jaws 13. By the time the rotation of the table has carried the nut to the position indicated at 45c in Figure 1, the stud 10 will have been disengaged therefrom and will likewise be depressed, the nut now riding upon the bushing 11. In this position the bushing is adjacent to an arm 21 pivoted as at 21a and having in its free end a slot 45c receiving the projection 11a of this bushing. This arm bears at its other end a stud 21b engaging in the slot of cam member 22. As the shaft 4 rotates the arm 21 is raised at the slotted end which receives the bushing projection 11a, and consequently the bushing itself is raised, elevating the nut 45b into a chute or stacking device 46 far enough to be engaged and caught and held therein by dogs 23 controlled by springs 24. The interior cross section of this stacking device 46 is of shape to hold the nuts therein against rotation in their prearranged positions. Thus, with hexagonal nuts, the cross section is hexagonal. The positioned nuts may be removed in groups from the device 46 by means maintaining their positions, or may be fed to a chute or the like maintaining their positions, or the device 46 may be removable for carrying the nuts away and replaceable after emptying, or by another similar empty device. In any event, the removal of the nuts from my positioning machine will be in a manner such that their positions are maintained to make it possible to locate the locking devices on all of the nuts in close proximity to a point in definite relation to the position of the thread in each nut.

This location is not necessarily exactly at such point, and for purpose of guidance by means of the flats of the nuts, I provide merely for locating the nut locking device in definite relation to the corner of the nut nearest the end of the thread. With a hexagonal nut, this never will be more than thirty degrees from the end of the thread, which is near enough, as this will insure that the locking device may be located on the nut so as to engage a thread of the bolt receiving the nut in the lower part of the space between threads. If all nuts were threaded with definite relation to the corners of the nuts it would not be necessary to allow for this variation for guidance of the nuts, after separation from spindle 10, by their flats; and an exact relation of location of the lock to the thread could be attained with such guidance. Of course, nuts are not practically obtainable, so threaded; but the variation I allow is not excessive, as above explained.

This variation occurs as the chuck 40 rises and releases the nut and the nut is carried between the spring pressed jaws 13 while the spindle 10 is unscrewing downward from the nut, having left the track 12 and engaged its pinion 10a with the segmental rack 12a and thus having loosened the nut from the shoulder on bushing 11 so that the nut is free to turn in either direction the slight degree necessary for it to aline its opposite flats with the jaws 13, which, by pressing inward on both sides of the nut cause this alinement. It will be understood that the track 12 ends and the segmental rack 12a begins in such exact relation, at both ends of the rack 12a, that the spindle 10 will make, as here shown, exactly one turn, so that when it reaches position 45a again, to receive another nut, its thread position relative to the shoulder on bushing 11 is the same as when receiving the previously located nut. Likewise, all four of the spindles 10 will be set and operated so as to receive every nut with the same thread and shoulder relation.

It will be noted that the number of chuck revolutions is much greater than the actual turns of the nut onto the spindle 10. This allows for a large number of turns of the nut by the chuck while the nut is "finding" the spindle thread, and also for the excess of turns permitted by the slip clutch at 28, after the nut has reached the shoulder. The actual rise and descent of spindle 10, however, is always the same, whether this be one turn as shown, which of course presupposes screwing the nut onto the spindle not more than one thread distance, or more than one turn if the nut is screwed on a greater distance. Whatever these factors are, the rotation of the spindle 10 by the segment 12a will always be exactly one turn, as here shown, or a number of full turns with no fractional turns, so that the relative thread position of the spindle always is regained as above noted.

As the spindle 10 is moved down in unscrewing from the nut, it is to be raised again, without turning it, between station 45a, where it receives a nut, and station 45b where it must be projected enough above the shoulder for the nut to catch its thread as turned by chuck 40. This is done by inclining the top of the track 12 upward as shown at 47 in Fig. 2; this top of the track 12 engaging the bottom of the spindle gear 10a and determining the elevation of the spindle at all points along its extent. Where this track 12 discontinues at the segment rack 12a it allows the spindle to fall and be supported by the bottom of its flat part 12b resting on the bottom 48 of the frame, at an elevation such that the bottom of the pinion 10a will again ride onto the top of the track 12 beyond the rack 12 as the pinion unmeshes from the rack and the flat 12b again coacts with the side of the track to limit the rotation of the spindle.

Figure 3:
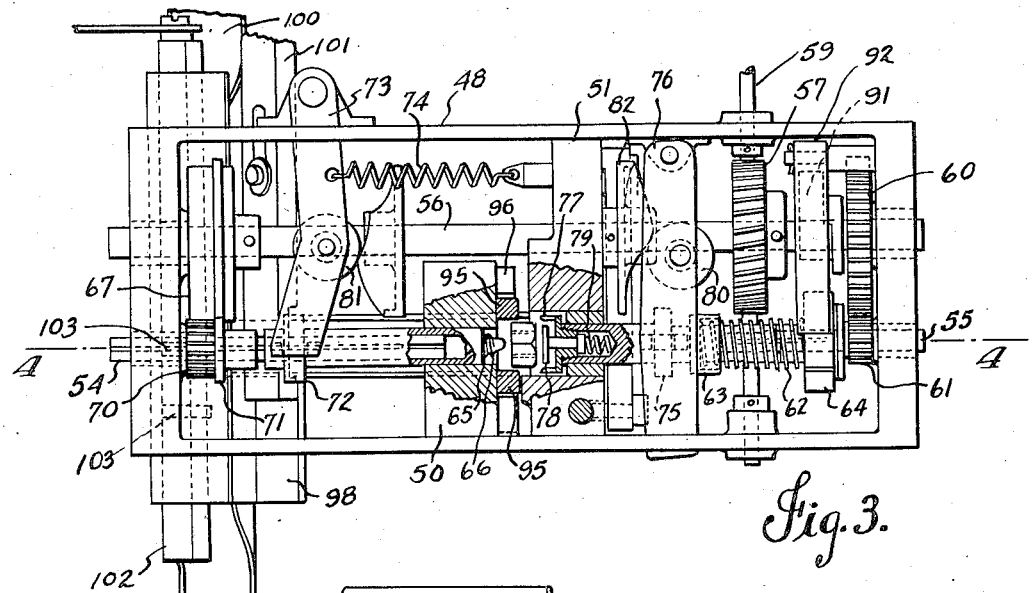
Figure 3 is a plan view, with parts in section, of a single spindle machine.

In Figs. 3 and 4 I have shown a modification which may be referred to as a single spindle machine, whereas the example of Figs. 1 and 2 is a multiple spindle machine. Also, in this single spindle example, the spindle is on a horizontal axis, which modifies the nut feeding arrangement. It will be understood however that the multiple spindle machine may operate with its spindles and their carrying table on a horizontal axis, with similar feeding. In this single spindle example, since the spindle is not carried around relatively to the frame, the provision for intermittent spindle rotation is modified also; the fixed segmental rack being here represented by a toothed segment of a mutilated gear which has a track portion where its teeth are absent, engaging to prevent rotation of the spindle in a manner analogous to the track 12 engaging the flat 12b in Figs. 1 and 2. Also, in this latter example, the spindle is moved axially by a timed cam movement, similar to that for the chuck; taking the place of the control of spindle elevation by the top of track 12 in the preceding example. Other parts, though changed in form, will be found analogous with like acting parts of the first example.

In the rectangular frame 48, having legs 49, bearing blocks 50 and 51 provide the bearings for the adjacent end parts of the spindle 52 and the chuck shaft 53, respectively. The ends of the frame 48 support the bearings for the outer ends of the spindle driving shaft 54 and the chuck driving shaft 55, respectively, and also the bearings for the main driving shaft 56 parallel with the spindle and above mentioned shafts. A worm gear 57 fixed on this main driving shaft 56 meshes with a worm 58 fixed on a shaft 59 extending out through a side of the frame 48. It will be understood that this last mentioned shaft may be the shaft of a suitable motor. At the right hand end, a gear 60 fixed on the main shaft 56 meshes with a pinion 61 fixed on the chuck driving shaft 55, so that the latter is rotated at a considerably greater speed than that of main shaft 56. Chuck shaft 53 is splined to its driving shaft 55 and is yieldingly pressed toward the spindle 52 by a helical spring 62 compressed between a collar 63 fixed on chuck shaft 53 and a ratchet wheel 64 splined on chuck driving shaft 55, later to be more fully described.

The spindle 52 is bored for some distance inward from its outer or rear end to receive the spindle driving shaft 54, on which it is splined. The front end of the spindle 52 bears the stud with the thread 65 to receive the nut, and a terminal tip 66 tapered to guide the nut onto the thread 65. At the left end of the machine, the mutilated gear 67 is fixed on the main driving shaft 56, with its toothed segment 68 and its track portion 69. The pinion 70 is fixed on the spindle driving shaft 54 to be meshed by the gear segment 68, and has at one side the flange 71 unitary with it and having a part which the gear track portion 69 will closely fit to prevent rotation of the spindle as soon as the gear segment 68 unmeshes from pinion 70 and until the segment again meshes with the pinion. It will be understood that the gear segment 68 will rotate, by the pinion 70, the spindle 52 exactly a non-fractional number of revolutions; in the example shown this being exactly one revolution. The spindle 52 has rotatable but axially non-movable on its outer or rear end part a collar 72 which is straddled by the forked end of a lever 73 extending across the main shaft 56 with its opposite end pivoted on the side of the frame 48. A spring 74 is stretched from this lever 73 to a fastening on the bearing block 51; thus yieldingly pressing the spindle 52 toward the chuck shaft 53, acting through lever 73.

A similar arrangement is provided for the chuck shaft 53; a collar 75 being rotatably but axially non-slidably mounted on chuck shaft 53 and straddled by the forked end of a lever 76 which extends across the main shaft 56 with its opposite end pivoted on the side of the frame 48. This lever thus will be under the pressure of the compressed spring 62 before described. The inner end of the chuck shaft 53 is concentrically bored and has secured in the end of the bore the chuck 77 with a pair of jaws to straddle the nut. Centrally this chuck 77 is bored for receiving and guiding the stem of the plunger 78 pressed outwardly by the spring 79 compressed between the inner end of its stem and the bore of the chuck shaft 53. This is similar to the arrangement of the plunger 53 in the chuck of the preceding example.

For limiting the approach of the chuck and the spindle under action of their respective springs 62 and 74 and for positively drawing the chuck and spindle apart, cams on the main driving shaft 56 coact with the levers 73 and 76, which have on them over said shaft 56 the rollers 80 and 81, respectively, on which the respective cams bear.

The cam 82 bearing on the chuck lever roller with an axially presented face also has a peripheral contour up against which a lever 83 fulcrumed on the adjacent side of bearing block 51 is held by action of a spring 84 compressed between the top of the bearing block 51 and a head 85 fixed on the upper end of a rod vertically guided in the block 51 and having its lower end pivoted to the free end of this lever. By this means, cam 82 holds head 85 down by the major circular part of its contour and allows spring 84 to raise the head 85 as a receding part of the contour reaches lever 83. Head 85 engages a projection 86 extending through a slot in the feed chute 87 from a trigger 88 pivoted therein. This chute extends vertically downward from the hopper 89 to the space between the blocks 50 and 51.

The cam 90 bearing on the spindle lever roller 81 has merely an axially presented cam face. The cams 82 and 90 have their axially presented faces so shaped and they are so timed with each other and with the mutilated gear 67 as to cause chuck and spindle recession as the gear segment 68 and pinion 70 mesh to unscrew the spindle from the nut; then to approach after unmeshing; the periphery of the cam 82 allowing action of trigger 88 to release the next nut as approach of the chuck and spindle begins.

A third cam 91 fixed on the main shaft 56 is timed to allow a pawl 92 to drop and engage ratchet wheel 64 just before unscrewing of the spindle from the nut begins. The chuck shaft 53 is frictionally driven by the chuck driving shaft 55, so that it may stop turning upon engagement of the nut with the shoulder of the spindle, the device 93 for this being similar to that of the preceding example. As soon as the spindle starts to unscrew from the nut, still held by the chuck, it turns the chuck shaft and ratchet wheel 64 in the same direction until it is stopped by the dropped pawl 92. The teeth of the ratchet wheel 64 are the same in number as the sides of the nut, in this case six, and are definitely arranged with relation to the chuck jaws, so that this action positions the nut with two of its opposite flat sides at the sides of the space where the nut has been screwed onto the spindle. Cam 91 is shaped to raise the pawl 92 and release the chuck soon after the chuck has disengaged the nut, so that the chuck may be driven for the next operation on a succeeding nut. The plunger 78 serves to yieldingly apply the nut to the stud, and also to insure disengagement of the nut from the chuck.

The exit passage 94 leads vertically downward from the operating space, and is offset from the entrance chute 87 toward the spindle; and the range of movement of the chuck and spindle axially is such that the nut is carried over this exit passage 94 by the time the spindle has unscrewed from the nut. This space is of width to act as a guide for the nut, by contact with its flat sides as positioned by the pawl and ratchet action above described; and as the spindle further recedes within the block 50, the nut falls down through this space with its position, relative to its threads. maintained by the guiding contact. To fully aline the nut with this space, the sides 95 are pivoted to swing apart slightly at their tops, against pressure of flat springs 96. This is to compensate for slight inaccuracy of positioning that may occur in the release action of the clutch and avoid any catching of the nuts at the entrance of the exit passage 94.

From the exit passage 94 the discharge chute 97 curves down to the left as seen in Fig. 4, and then extends in a straight incline between the frame legs 49 to join branch discharge chutes 98, 99 and 100. The chute 98 discharges to one side of the main chute 97 just above the chute 99 at the same side, and the third chute 100 discharges to the opposite side and is alined with the lower chute 99. In upper chute 98 is a pusher 101, and a double acting pusher 102 operates in the two lower chutes 99 and 100. These pushers 101 and 102 may be connected to mechanism of the drilling machines that drill a hole in each nut positioned by my machine. The lower pusher 102 has two lugs 103, either one to push while the other prevents entry of a nut into lower chutes 99 and 100 until pusher 102 has been moved one way or the other from mid position by the drilling machine operating device. In this way each one of the three chutes is under control of the respective drilling machine which it feeds. The nuts are guided by their flat sides in main inclined chute 97, the same as in the exit passage 94; but as they change direction at right angles in the branch chutes, they collectively retain their correct positions by each nut engaging a flat side with the flat side of the next nut.

In Fig. 5 I illustrate an embodiment of my invention in which the nut is positioned on the stud and drilled and provided with its locking device while so positioned, after which it is removed from the stud in completed condition. The rotary table 104 turning over to the left with ratchet wheel 105 driven by pawl 106, carries four spindles 107, each with a pinion 108 and a flat part 109 as in Figs. 1 and 2. The chuck 110 is represented by its three jaws, at the discharge end of the nut feeding chute 111, and it will be understood that the parts may be constructed and operated at this station as shown in Figs. 4 and 5. At the next two stations are drilling devices 112 and 113; the first one drilling a hole partly through the nut and the second drilling the hole the rest of the way. This reduces drill breakage. At the fourth station is the device 114 which inserts the piece of wire and fastens it in the hole that has been drilled; being supplied with the wire from a reel 115. A shaft 116 carries the crank that operates the table driving pawl 106, and also carries cam means 117 which operates the feeding means 118 of the drilling devices 112 and 113 by a lever 119, and controls the operation of the wire inserting device 114 by element 120. The drilling mechanisms and wire inserting mechanism are not indicated in detail, as these in themselves do not form part of my invention; having been successfully operated by others, but without association with my invention.

In this example, the setting of the nut relative to the corner nearest the end of the thread is done by means somewhat modified from those of the previous examples. As this is done while the nut is still on the spindle 107, the latter is allowed to turn sufficiently for this setting, just after it leaves the station where the nut is screwed onto it, and the setting device thereafter maintains the position of both nut and spindle until after all work is completed and the spindle is to be unscrewed from the nut. After this, the spindle is again set to the required angular position and elevation for receiving the next nut, by the time it reaches the station where the nut is screwed onto it. As here shown, the nut setting is done by a sliding jaw 121 at each spindle 107, slid toward the spindle in guides 122 and having a crotched end 123 to straddle two adjacent sides of the nut. The sliding of these jaws 121 is effected and controlled by a fixed cam 124 concentric with the table rotation and having a receding part of its periphery at 125 opposite the screwing-on station, so that the jaws 121 may recede out of engagement with the nut as it is being rotated by the chuck 110 to screw the nut onto the spindle. Upon further rotation of the table the jaw rides out on the cam 124 into engagement with the nut upon reaching the major concentric part 126 of the cam, which maintains the jaw engagement with the nut until the spindle has been unscrewed therefrom after passing the wire insertion device 114. The jaws have rollers 127 bearing on the cam 124.

The unscrewing of the spindle from the nut is done by means of the rack segment 128 located between the wire inserting device 114 and the discharge station, where there is a fender 129 which guides the released, completed nut off the rotating table 104 into a receptacle 130. This unscrewing means is similar to that of Figs. 1 and 2; the track 131 being discontinued opposite to the rack 128, in accurate relation thereto for restoring the exact angular position of each spindle, as fully described for that example. The track also will be understood to have the upward incline at 132, from the unscrewing station to the screwing-on station, as was also described for the previous example. At the screwing-on station the track portion 133 of course is closely engaged by the flat part 109 of the spindle; but to allow the spindle to rotate with the nut as the latter is set by the jaw 121, the track recedes radially inward at 134 and continues on the reduced radius to its end at the rack 128. The only purpose of this continued part 135 of reduced radius is to maintain the spindle elevation by engagement of the spindle gear 108 with the top of the track, which will be understood from the example in Figs. 1 and 2.

It will be seen that in this last example, as all of the work is done on the nuts while held on the spindles, there is no need of means for maintaining any definite position of the nut after it leaves the spindle; the nuts falling haphazard into the receptacle 130, which may be the keg or other container in which the nuts are stored and shipped. This is a machine, not merely for positioning nuts, but for making lock nuts entirely automatically; but it embodies the principle of my positioning mechanism in the broad sense of positioning a nut relative to its corner and to the end of its thread and then engaging the positioned nut for the purpose of performing an operation thereon in definite relation to the corner of the nut thus selected.

In any of the examples, further modifications are within the scope of my invention. For example, instead of holding the spindle stationary and turning the nut, in the screwing-on operation, the nut may be held and the spindle screwed into the nut and then reversed for unscrewing, in timed relation to the device engaging the positioned nut. That is, the nut necessarily is held, to maintain its selected position, for unscrewing; but either kind of relative rotation of spindle and nut is permissible, whether rotation of the spindle alone or of the nut alone, or of both, when screwing the spindle and nut together. In any example the spindle or spindles may be on either a horizontal axis or a vertical axis, or an inclined axis, with appropriate feeding means as will be understood from the examples given. Various other modifications may occur, and I am not limited to the specific examples herein disclosed, but claim:

1. In a machine for locating nuts with respect to the starting point of their threads, a threaded spindle having a locating shoulder, means for causing the nut to be threaded onto said spindle so as to locate the nut, and means for removing the nut from the spindle while maintaining with respect to some part of the machine, the location of said nut as determined by said spindle.

2. In a machine for locating nuts with respect to the starting point of their threads, a threaded spindle having a locating shoulder, means for screwing a nut onto said spindle so as to locate the same against said shoulder, and means for unscrewing said spindle from said nut to leave said nut in located position.

3. In a machine for locating nuts with respect to the starting point of their threads, means for feeding nuts serially, a threaded spindle having a locating shoulder, means for causing relative rotation of each nut and the spindle so as to locate the nut by means of said shoulder, means for causing relative rotation of each nut and said spindle relative to each other to release the interengagement thereof, and means for receiving serially the nuts so located and for maintaining the location thereof.

4. In a machine for locating nuts with respect to the starting point of their threads, a hopper, means for feeding nuts from said hopper, a threaded spindle having a locating shoulder, a chuck for screwing each nut on said spindle so as to locate the same, means for releasing the interengagement of said nut and said spindle, and means for assembling said nuts in located relationship.

5. In a machine for locating nuts with respect to the starting points of their threads, a device for feeding the nuts, a device comprising a threaded spindle and a locating shoulder, a chuck for screwing the nuts onto said spindle against said shoulder so as to locate the nuts, a device for releasing a nut and spindle from each other while maintaining the location of the nut, a device for assembling the nuts in located relationship, and means for operating said devices automatically in timed relationship.

6. In a machine for positioning nuts with respect to the position of the threads in the nuts, a threaded spindle, means for relatively rotating a nut and the spindle for screwing the nut onto the spindle, means for limiting the distance to which the nut is screwed onto the spindle, means for limiting rotation of the screwed-on nut, means for unscrewing the spindle from the nut the same distance that the nut was screwed onto the spindle, and means for guiding the nut away from the spindle while maintaining a definite position of the nut with respect to its thread position as derived from the positioning of the nut on the spindle.

7. In a machine for positioning nuts with respect to the position of the threads in the nuts, a threaded spindle, means for limiting the distance to which a nut may be screwed onto the spindle, a chuck coaxial with the spindle, adapted to grip the nuts, said spindle and said chuck being movable axially toward and away from each other, means timed with the axial movement to feed nuts between the chuck and spindle when the latter are moved away from each other, devices acting in timed relation to cause relative rotation of the spindle and chuck while moving the spindle and chuck toward each other, to screw the nut onto the spindle, and then to withdraw the chuck from the nut, then to limit rotation of the nut and unscrew the spindle from the nut the same distance that the nut was screwed onto the spindle, and means receiving the nut thus released from the spindle for guiding the nut away from the spindle while maintaining a definite position of the nut with respect to its thread position as derived from the positioning of the nut on the spindle.

8. A machine as set forth in claim 7, in which the device for moving the chuck and spindle axially comprises means for positively moving the chuck and spindle away from each other and means yieldingly moving the chuck and spindle toward each other, permitting obstruction of the discharge of nuts away from the spindle without stoppage of the devices that move the spindle and chuck positively.

9. A machine as set forth in claim 7, in which the device rotating the chuck comprises a releasable connection permitting stoppage of rotation of the chuck at the limit of distance to which the nut is screwed onto the spindle without stoppage of the means that drives the chuck rotating device.

10. In a machine for positioning nuts with respect to the position of the threads on the nuts, a threaded spindle, means for limiting the distance to which a nut may be screwed onto the spindle, means for relatively rotating a nut and the spindle for screwing the nut onto the spindle, means for limiting rotation of the screwed-on nut, means for unscrewing the spindle from the nut the same distance that the nut was screwed onto the spindle, whereby all nuts successively screwed onto the spindle will be positioned substantially alike with respect to their thread positions, and means for engaging the like positioned nuts whereby an operation may be performed at a location on each nut definitely positioned with respect to the position of the thread therein.

11. In a machine for positioning nuts with respect to the position of the threads in the nuts, a series of threaded spindles guided along a common path, means for moving the spindles intermittently along said path, a device for screwing nuts onto all of the spindles to a substantially uniform distance, a device for unscrewing the spindles from the nuts to the same distance, whereby all nuts successively screwed onto the spindles will be positioned substantially alike with respect to their thread positions, and means for engaging the like positioned nuts whereby an operation may be performed at a location on each nut definitely positioned with respect to the position of the thread therein, the last mentioned means and the device for screwing the nuts onto the spindles, and the device for unscrewing the spindles from the nuts being at various stations along the path of the spindles and being operated in timed relation with the intermittent movement of the spindles along the path.

12. A machine as set forth in claim 10, in which the means for unscrewing the spindle from the nut comprises a pinion turning with the spindle, and a gear segment, said spindle and said gear segment being relatively rotatable for intermittent meshing of the pinion and segment, and said machine also including mutually engaging means fixed to the spindle and the gear segment, respectively, preventing rotation of the spindle in the intervals when its pinion is unmeshed from said gear segment, for screwing the nut onto the spindle.

13. A machine as set forth in claim 10, in which the means for screwing the nut onto the spindle comprises a chuck and yielding means on the chuck to press the nut to the spindle and to effect separation of the chuck and the nut after the nut has been screwed onto the spindle.

14. A machine as set forth in claim 6, in which the means for guiding the nut away from the spindle comprises guiding branches and means for directing nuts successively into the respective branches while maintaining the described position of the nut.

15. In a machine of the character described, a threaded spindle, means for screwing said spindle and a nut together a definite predetermined distance, means for unscrewing the spindle from the nut the same distance, means for maintaining the relative angular positions of the unscrewed spindle and nut, and means for returning the spindle axially from its displaced position incident to the unscrewing, to its initial position while maintaining the relative angular positions of the nut and spindle.

16. In a machine for locating nuts with respect to the starting point of their threads, a device comprising a threaded spindle and a locating shoulder, a chuck for engaging the nuts, means for feeding the nuts serially to the chuck, means for relatively rotating the chuck and spindle to screw a nut onto said spindle against said shoulder to locate the nut, means for rotating the spindle and holding the nut stationary to separate the spindle and nut, means for maintaining the located position of the nuts, and means for receiving and assembling the located nuts.

17. In a machine as set forth in claim 16, branches leading from the assembling means, and means for diverting the nuts therefrom to the respective branches while maintaining the location of the nuts established by the machine.

18. A machine as set forth in claim 16, in which the means that causes the relative rotation of the chuck and spindle holds the spindle stationary while rotating the chuck.

19. A machine as set forth in claim 16, including a supplementary locating means acting by engagement with an exterior surface of the nut and definitely relocating the nut with respect to a point on the exterior surface thereof selected as a result of the positioning of the nut on the spindle, whereby an operation may be performed on each nut at a point definitely located relatively to the exterior shape of the nut but closely approximating a definite location relative to the position of the thread in the nut.

20. In a nut sorting machine, the combination with nut feeding devices, of an automatically operated bolt arranged to engage and disengage the nuts successively to position them according to the start of the thread, and discharge means for receiving the nuts after being so positioned.

21. In a machine of the character described, a spindle movable axially as well as being rotatable, means for relatively positioning a nut for screwing the nut and spindle together, means to cause relative rotation of the nut and spindle to screw the nut and spindle together, means for advancing the spindle axially to the nut for the screwing-on operation, and means to partly unscrew the nut and spindle from each other, for definitely repositioning the nut on the spindle with respect to a point on the exterior surface of the nut, selected as a result of the positioning of the nut on the spindle while preserving a position of the nut closely approximating a definite position relative to the position of the thread in the nut.

HOWARD W. HUNT.